Oct. 15, 1929.  H. W. LOVETT  1,731,631
HOBBLE FOR CULTIVATORS
Filed June 12, 1924  2 Sheets-Sheet 1
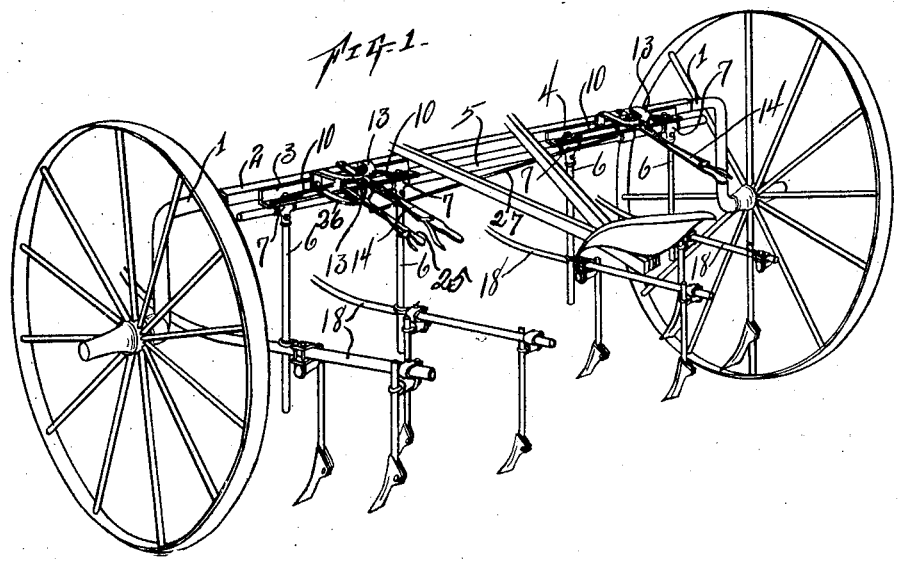
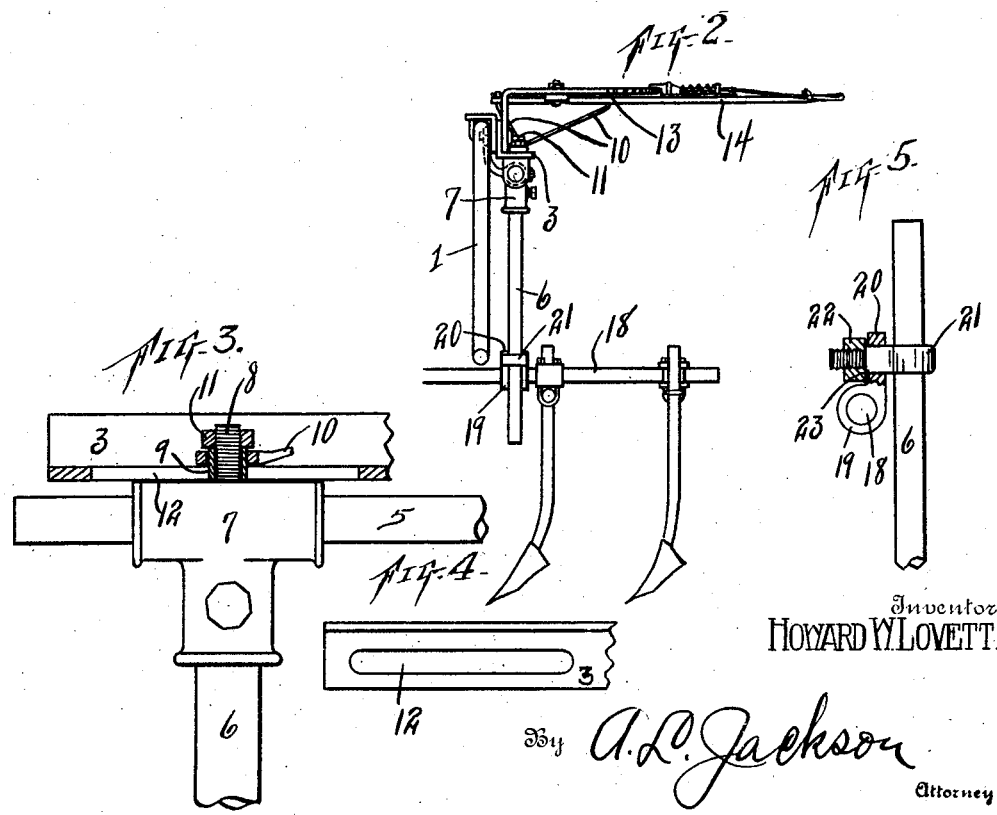
Inventor
HOWARD W. LOVETT.
By A. L. Jackson
Attorney

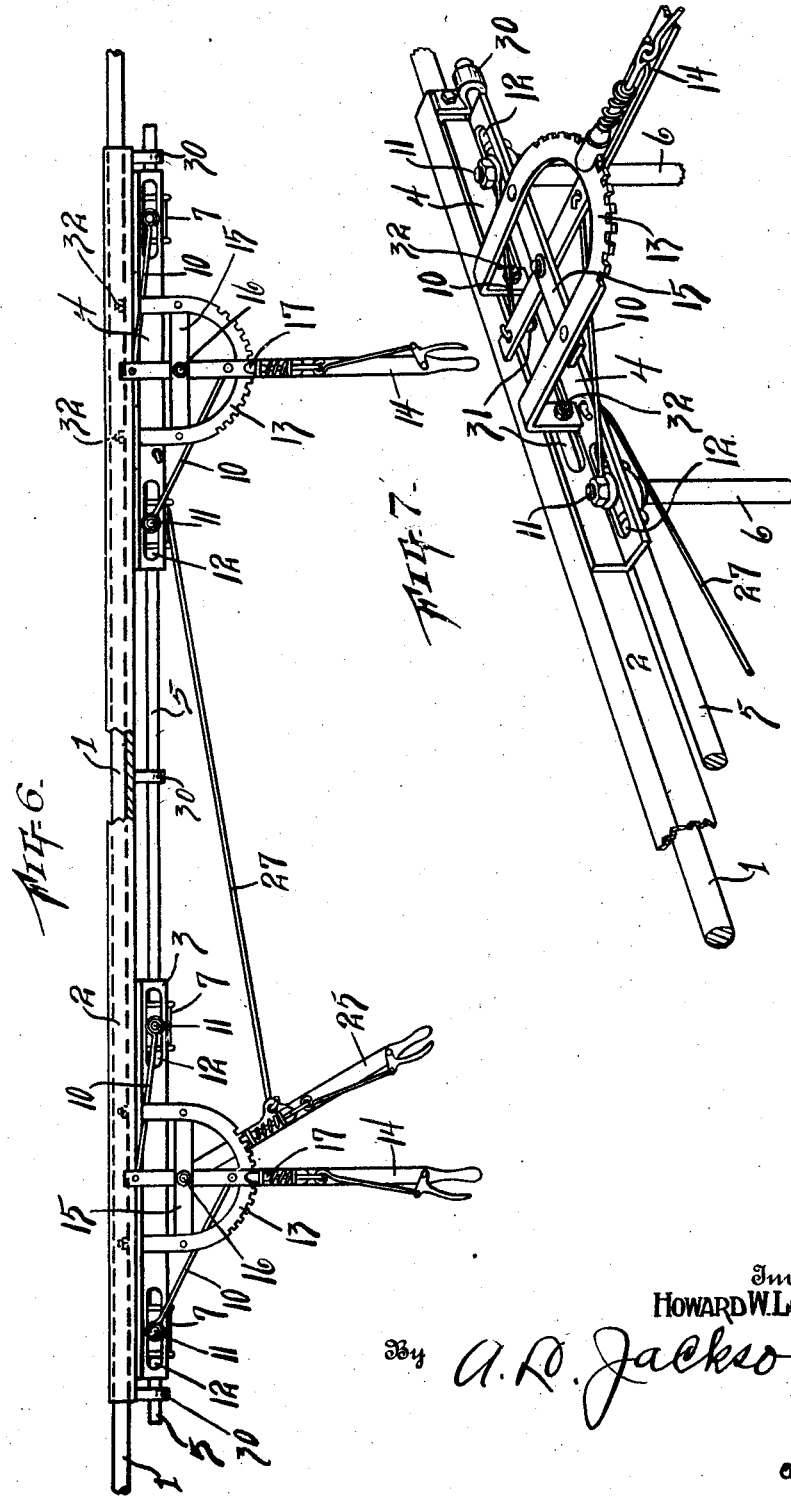

Patented Oct. 15, 1929

1,731,631

UNITED STATES PATENT OFFICE

HOWARD W. LOVETT, OF MIDLOTHIAN, TEXAS

HOBBLE FOR CULTIVATORS

Application filed June 12, 1924. Serial No. 719,689.

My invention relates to hobbles or gang adjusters for cultivators; and the object is to provide a simple and convenient way of adjusting the plows of a single or double row cultivator which can be quickly attached to a cultivator, which is manufactured at small cost, and which is easily operated without stopping the cultivator. Other objects and advantages will be fully explained in the following description and the invention will be more particularly pointed out in the claims.

Reference is had to the accompanying drawings which form a part of this application.

Fig. 1 is a perspective view of a cultivator provided with the improvements.

Fig. 2 is a side elevation of the same.

Fig. 3 is an enlarged detail view, showing the connection of the plow standard to the adjusting devices.

Fig. 4 is a detail view of one end of one of the adjusting and guide frames.

Fig. 5 is a detail view, showing the manner of connecting the plow beams to the standards.

Fig. 6 is a plan view of the attachments on an enlarged scale.

Fig. 7 is a perspective view of one end of the frame and of the devices shown on the right side of Fig. 7 showing a variation in one of the guiding frames.

Similar characters of reference are used to indicate the same parts throughout the several views.

The cultivator to which the improvements are applied may be of several different types. The drawings show an axle 1 of ordinary type, extending from the wheels of the cultivator up and then horizontally across. The axle 1 is attached to the main frame 2 in the usual manner. Supporting and guiding frames 3 and 4 are operatively connected to the frame 2, as shown in Fig. 1. A guide rod 5 for lateral movement of the plow standards 6 is attached to the frame 2 by brackets 30. The standards 6 have hollow cross-heads 7 by which same are slidably hung on the rod 5. The frames 3 and 4 are associated with the heads 7. Bolts 8 are rigid with the heads 7 and project upwardly through the slots 12 in the frames 3 and 4 loosely, and antifriction bearings 9 surround a portion of each bolt 8 and rest on the heads 7. The bearings 9 make antifriction bearings for the adjusting rods 10. These bearings 9 also project loosely through the slots 12 in the frames 3 and 4. Adjusting rods 10 engage the bearings 9 loosely and nuts 11 are screwed down on the bolts 8 and tightened on the bearings 9. The bearings 9 perform the additional function of preventing the nuts 11 from binding the adjusting rods 10. The nuts 11 hold the heads 7 and adjusting rods 10 and the frames 3 and 4 assembled. Racks 13 are attached to the frame 2 and are incidentally attached to the guiding frames 3 and 4, the bolts which attach the racks to the frame 2 passing through the frames 3 and 4. The frame 3 is rigid with the frame 2. The frame 4 may be made adjustable laterally, as shown in detail in Fig. 8, by providing slots 31 in the upright member of frame 4 for bolts 32 which attach the rack 13 and frame 4 to the frame 2. This provision is necessary in case the slots 12 are not long enough to permit the necessary shifting of the heads 7. The frame members 1 and 2 constitute no part of this invention but are used in the combination. When a greater adjustment is required for the beams 18 than can be made by simply shifting the heads 7 by lever 14, the frame 13 can be shifted manually by reason of the bolts 32 being movable in the slots 31 in the upright members of frame 4 and the corresponding depending member of frame 2.

Adjusting levers 14 are fulcrumed on the cross-bars 15 which are attached to the racks 13. One adjusting rod 10 is pivotally connected to a lever 14 and to a bearing 9 which projects through slot 12 in frame 3 in one end thereof and the other adjusting rod 10 is pivotally connected to the bearing 9 which projects through slot 12 in the other end of frame 3 and to the same lever 14. The levers 14 are pivotally connected to the rods 10 on the opposite sides of the fulcrums 16.

The levers 14 are provided with spring dogs 17 for engaging the teeth of the racks 13 for holding the levers at different positions.

The standards 6 are carried by the heads 7 and the heads are moved by the adjusting levers 14 through the adjusting rods 10 and their connections above described. The standards 6 move the plow beams 18 to the required positions and are connected to the plow beam by cuffs 19 which are rigid on the plow beams. The cuffs have upstanding bearings 20 and eye-bolts 21 project therethrough and nuts 22 are screwed on the eye-bolts 21 to hold the same in place. The eye-bolts 21 have shoulders 23 against which the nuts 22 are tightened, the object being to permit the turning of the eye-bolts in the bearings 20 and to prevent binding or cutting the standards.

What I claim, is,—

1. In a cultivator provided with a main frame and plow beams; hobbles for adjusting said plow beams comprising a transverse rod attached to said main frame and forming a part thereof, a pair of guiding frames attached to said main frame and one of said frames being movable laterally and means for moving the same and said frames being provided with slots near the ends thereof, standards provided with stud bolts projected through said slots and operatively connected to said guiding frames and having their lower ends connected to the plow beams, rack frames and racks thereon and levers fulcrumed on said racks, and adjusting rods pivotally connected to said stud bolts and to said levers at opposite sides of their fulcrum.

2. In a cultivator provided with a main frame and plow beams; hobbles for adjusting said plow beams comprising a pair of guide frames mounted on said main frame and provided with slots therethrough near each end, a transverse rod attached to said cultivator frame, heads slidably mounted on said transverse rod and provided with threaded studs projected through said slots, rack frames and racks thereon and levers fulcrumed on said rack frames and provided with dogs engaging said racks, standards carried by said heads and operatively connected to said plow beams, and adjusting rods pivotally connected to said studs and pivotally connected to said levers at opposite sides of said fulcrums.

3. In a cultivator frame provided with a main frame and plow beams, guide frames mounted on said main frame and each provided with slots therethrough near their ends, rack frames and racks thereon, a transverse rod and means for attaching the same to said main frame, heads mounted on and movable on said rod and having studs projecting through said slots, levers fulcrumed on said rack frames and adjusting rods pivotally connected to said studs and pivotally connected to said levers, and standards carried by said heads and operatively connected to said plow beams.

In testimony whereof, I set my hand, this 24th day of May, 1924.

HOWARD W. LOVETT.